Patented Mar. 21, 1933

1,902,185

UNITED STATES PATENT OFFICE

HORST ROTHE, OF BERLIN, GERMANY, ASSIGNOR TO TELEFUNKEN GESELLSCHAFT FUR DRAHTLOSE TELEGRAPHIE M. B. H., OF BERLIN, GERMANY, A CORPORATION OF GERMANY

METHOD OF COATING ELECTRODES OF DISCHARGE TUBES

No Drawing. Application filed February 20, 1932, Serial No. 594,399, and in Germany March 31, 1931.

In order to decrease the secondary electron emission of the electrodes of electron discharge tubes, such as the grids of transmitter and similar tubes, the said electrodes have been, as is known, provided with a coating of chromous oxide ($Cr_2O_3$) usually produced on the electrode by electrolytic means.

The object of the present invention is to provide a simpler method of producing a durable coating of chromous oxide on the electrodes, such as the anodes and grids, of electron discharge tubes, and thereby make the secondary electron emission from such coated electrodes much lower than it would be if the electrodes were not coated. To this end, and in accordance with the present invention, a durable coating of chromous oxide is produced on a metal electrode in a simple manner by first placing upon the electrode to be treated a coating of an oxide of chromium, such as chromic oxide ($CrO_3$) and heating the coated electrode to remove some of the oxygen and convert the coating into the more stable chromous oxide ($Cr_2O_3$).

As chromic oxide is soluble in water, a convenient way of carrying out this invention is to apply to the electrode by painting, spraying, or in any other convenient way, a water solution of chromic oxide of such strength as to produce on the surface of the electrode a coating containing the desired amount of chromic oxide, and then heating the electrode, preferably in an inert environment, for example, in hydrogen, to convert the chromic oxide coating into the more stable chromous oxide. In this way there is produced upon the electrode a durable coating consisting of fine particles of stable chromous oxide, and the secondary electron emission from the electrode is thereby greatly decreased.

The strength of the water solution of chromic oxide to be used may be varied in accordance with the amount of coating desired. A solution of 500 grams of chromic oxide in one liter of water may be used, and the electrode may be coated with this solution in various ways, as by painting or spraying with the solution, or the electrode may be placed in the cold solution, which is then brought to the boiling point, and the electrode left in the boiling solution for some time, until the desired coating is obtained. The electrode may then be removed from the solution, dried in an oven, and then heated in a muffle furnace, or in an inert environment, such as in a vacuum or in hydrogen, to a temperature at which the chromic oxide is converted into the more stable chromous oxide. Usually this conversion will take place at temperatures between 400 degrees C. and 700 degrees C., although the coated electrodes may be heated to higher temperatures if desired, provided the temperature is not raised to a point at which reaction occurs between the chromous oxide and hydrogen if the electrode is heated in an atmosphere of hydrogen.

The coating produced by this method is a black coating having the appearance of soot, and apparently consists of very fine discrete particles of chromous oxide which adhere to the electrode and form a continuous coating covering all of the surface of the metal.

An electrode treated in accordance with this invention is particularly useful in an electron discharge tube having cathodes containing or coated with alkaline earth oxides. When such cathodes are operated at high temperature the material vaporizes to some extent, and deposits on the cooperating electrodes. As this vaporized material is normally of high electron emissivity it may cause undesired emission from those electrodes if they become hot during the operation of the tube, but this vaporized material seems to lose most of its electron emissivity when deposited on an electrode coated in accordance with this invention, and hence does not cause emission from such electrodes.

I claim:

1. The method of treating a metal electrode for electron discharge devices to decrease its secondary electron emission which consists in applying to said electrode a coating of chromic oxide, and heating said coated electrode in an inert environment to convert said chromic oxide to chromous oxide.

2. The method of treating a metal electrode for electron discharge devices to decrease its secondary electron emission which consists in applying to said electrode a water solution of chromic oxide, drying said electrode to produce on it a coating of chromic oxide, and heating said coated electrode in hydrogen to convert said coating into chromous oxide.

3. The method of treating a metal electrode for electron discharge devices to decrease its secondary electron emission which consists in applying to said electrode a coating containing chromic oxide dissolved in water, and heating said electrode to produce on its surface a dry coating of chromous oxide.

4. The method of manufacturing electron discharge devices which comprises producing on the surface of an electrode a coating of chromic oxide, and heating said electrode to convert said coating into chromous oxide.

HORST ROTHE.